United States Patent [19]
Vohra

[11] Patent Number: 6,105,335
[45] Date of Patent: *Aug. 22, 2000

[54] SUSTAINABLE WALL CONSTRUCTION AND EXTERIOR INSULATION RETROFIT TECHNOLOGY PROCESS AND STRUCTURE

[75] Inventor: Arun Vohra, Bethesda, Md.

[73] Assignee: The United States of America as represented by the United States Department of Energy, Washington, D.C.

[*] Notice: This patent is subject to a terminal disclaimer.

[21] Appl. No.: 09/197,424

[22] Filed: Nov. 23, 1998

Related U.S. Application Data

[60] Provisional application No. 60/067,049, Dec. 4, 1997.

[51] Int. Cl.[7] .................................................. E04B 1/00
[52] U.S. Cl. .................................. 52/741.41; 52/741.14; 52/745.09; 52/406.3; 52/407.4; 52/454; 52/293.1
[58] Field of Search ............................. 52/2.13, 405.3, 52/406.1, 406.2, 406.3, 407.4, 454, 293.1, 741.14, 741.41, 741.13, 745.09, 742.13, DIG. 9

[56] References Cited

U.S. PATENT DOCUMENTS

| | | | |
|---|---|---|---|
| 312,375 | 2/1885 | Orr | 52/DIG. 9 |
| 1,472,642 | 10/1923 | Evans, Jr. | 52/745.09 X |
| 1,887,113 | 11/1932 | Bartels | 52/454 X |
| 2,252,578 | 8/1941 | Powell | 52/406.1 X |
| 3,982,362 | 9/1976 | Moore | 52/DIG. 9 X |
| 4,177,618 | 12/1979 | Felter | 52/406.1 X |
| 4,292,775 | 10/1981 | Howard | 52/454 X |
| 4,399,645 | 8/1983 | Murphy et al. | 52/406.2 X |
| 5,475,950 | 12/1995 | Palmer | 52/293.1 X |
| 5,794,393 | 8/1998 | Fearn | 52/742.14 X |
| 5,819,496 | 10/1998 | Sperber | 52/742.13 |
| 5,875,607 | 3/1999 | Vohra | 52/741.41 |

FOREIGN PATENT DOCUMENTS

| | | | |
|---|---|---|---|
| 3402-377 | 8/1985 | Germany | 52/406.1 |
| 3502-323 | 7/1986 | Germany | 52/406.2 |
| 2215751 | 9/1989 | United Kingdom | 52/406.1 |
| WO 92/16785 | 10/1992 | WIPO | 52/406.2 |

*Primary Examiner*—Carl D Friedman
*Assistant Examiner*—Brian E. Glessner
*Attorney, Agent, or Firm*—William R. Moser; Paul A. Gottlieb

[57] ABSTRACT

A low-cost process for exterior wall insulation retrofit, or new wall construction by stacking layers of fabric tube filled with insulating material against a wall and covering them with mesh and stucco provides a durable structure with good insulating value.

34 Claims, 3 Drawing Sheets

6,105,335

SUSTAINABLE WALL CONSTRUCTION AND EXTERIOR INSULATION RETROFIT TECHNOLOGY PROCESS AND STRUCTURE

This application claims benefit of provisional application Ser. No. 60/067,049 filed Dec. 4, 1997.

BACKGROUND OF THE INVENTION

The invention relates to insulation retrofit for exterior walls, or construction of walls for new houses or buildings, in particular, low-cost insulation using readily available materials which can be assembled on-site. Very low cost sustainable insulation materials and systems are needed for certain applications, such as improving the energy efficiency and comfort levels of houses. These insulations would be based on locally available materials that require a minimum of physical or chemical processing to make them useable and could rely on unskilled labor for installation. This technology solves the problem of insulating existing houses with solid walls, such as those constructed of adobe, stone, masonry or logs. Such houses exist in Alaska, the Southwest and in many other parts of the world, and they are difficult and expensive to insulate using conventional methods. The technology was demonstrated by using pumice, flyash and sawdust as the insulating material. Much of the prior art pertains to factory made articles which are not assembled on-site from readily available materials.

Bulk loose fill natural, manufactured, and recycled resource-efficient materials such as pumice, flyash, bottom ash, sawdust, shredded leaves, peat moss, expanded clays and shales, vermiculite, and perlite have moderate insulation values and are locally available in many areas. Use of such materials provides a means to retrofit exterior wall insulation or construct energy efficient walls for new buildings, at minimal cost. A problem is that the loose fill material must be used without mixing it with portland cement otherwise it loses the insulating value. For example, pumice is a naturally occurring, lightweight volcanic ash that has a moderate thermal resistivity. However, when pumice is mixed with portland cement to make masonry units or concrete, it loses over 90% of its thermal resistance. Therefore, it is important to use the material alone as a dry loose fill material, as this invention does. For retrofit, blowing or mechanically conveying bulk loose-fill material into a long, woven fabric tube layered upon itself against the exterior wall enables the insulating structure to conform to uneven wall and ground surfaces. Insulation members such as those described in U.S. Pat. No. 3,979,870 utilize low cost insulation materials but are not readily assembled on-site and are rigid and thus do not conform to uneven surfaces. For new construction, a wall is constructed according to the present invention by blowing bulk loose-fill material into a long, woven fabric tube layered upon itself.

SUMMARY OF THE INVENTION

The invention relates to a low-cost process for insulating existing walls and constructing new walls comprising:

For retrofit:

A process for insulating existing walls is provided, comprising (a) blowing or mechanically conveying bulk loose-fill insulating material is into a long, woven or nonwoven fabric tube, (b) layering said tube upon itself, (c) stacking the layered tube against the exterior surface of a wall until the wall is covered, the stack of layers thus formed having fasteners to attach to a mesh (e.g., straps looped between adjacent layers of the fabric tube and fastened to the wall), (d) stretching a mesh (e.g., chicken wire or stucco netting) over the layers of fabric tube, covering the side of the tubes which is not adjacent to the wall, (e) fastening the mesh to stationary objects, (f) attaching the mesh to said fasteners on said layers of fabric tubes, and (g) applying a cemetitious material (e.g., stucco) to the mesh and allowing it to harden.

Stacking the layers of fabric tubes against the wall is preferably preceded by laying a base on the ground at the foot of the wall using a material such a cement or crushed stone wrapped in a fabric (e.g., non-woven geosynthetic felt). It is also preferred to erect stationary corner posts at the ends of the wall to be insulated, the top ends of the posts being tied to each other and/or tied or otherwise anchored to the wall.

The invention also includes the structure made by this process. The structure comprises a stack of layers of fabric tubes containing insulating material next to the exterior wall of a building, said layers of fabric tubes containing insulating material, being attached to said wall, and having a covering of cementitious material on the side not adjacent to said wall.

For new construction:

For new construction, a wall is constructed by blowing bulk loose-fill material into a long, woven fabric tube layered upon itself. The same steps (a) through (g) are followed except that the layered tube is stacked in a free-standing manner or against a support, the stucco netting is attached to both sides of the wall, and a cementitious material (e.g., stucco) is applied to the mesh and allowed to harden on both sides of the wall. The fill material may or may not have substantial insulating properties. Depending on the fill material, the wall may be either load bearing or may be used for infill in a post-and-beam structure.

BRIEF DESCRIPTION OF THE DRAWINGS

For retrofit.

Figure 2A:
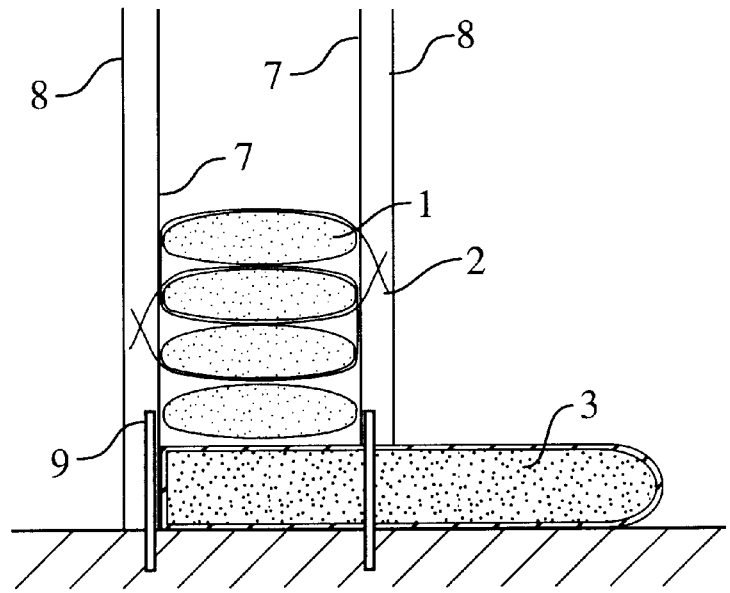

For new wall construction:

FIG. 2A is a side view of the layers of fabric tubes of material, stacked vertically before application of cementitious material.

Figure 2B:
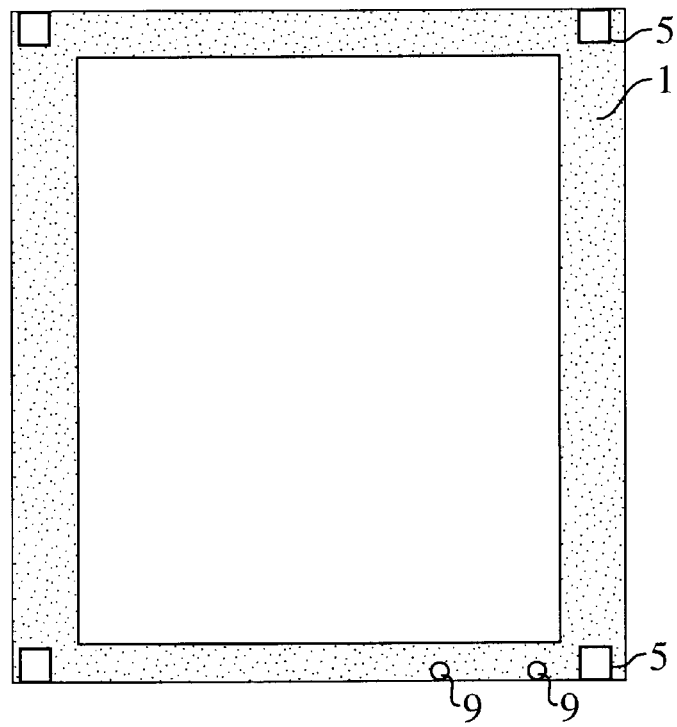

FIG. 2B is a top view showing the tubes with straps looped around them and corner pots at the ends of the wall.

Figure 3A:
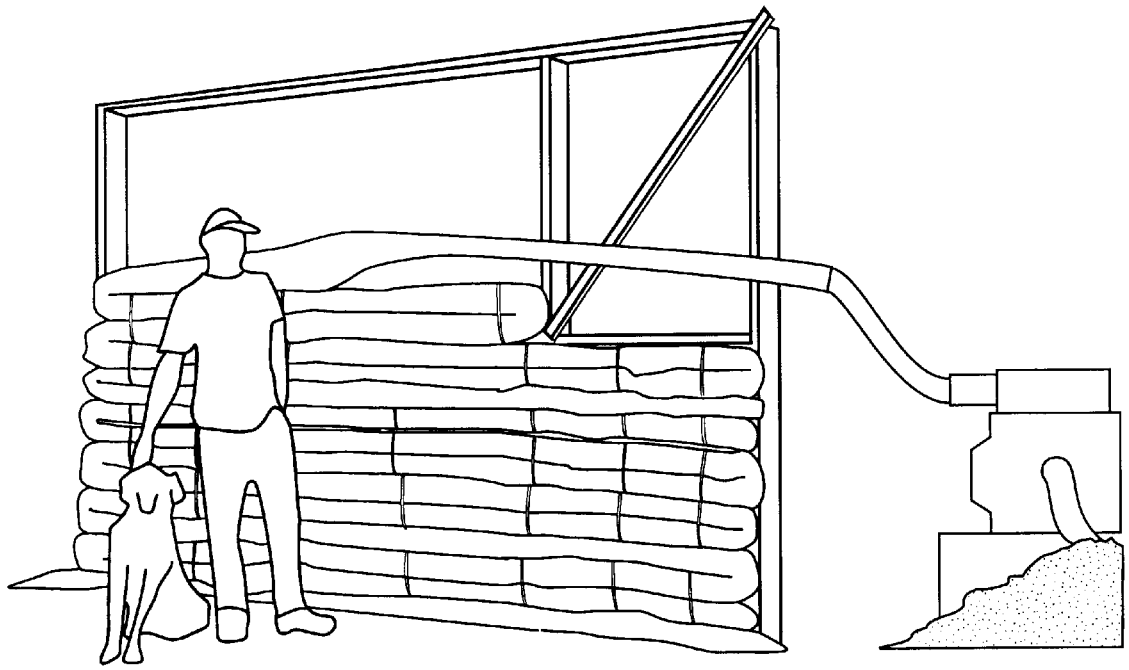

FIG. 3A is a view facing the wall showing a new wall being constructed by blowing loose fill material into a fabric tube folded upon itself at the ends and having straps looped between the tubes to tie to stucco mesh.

Figure 3B:
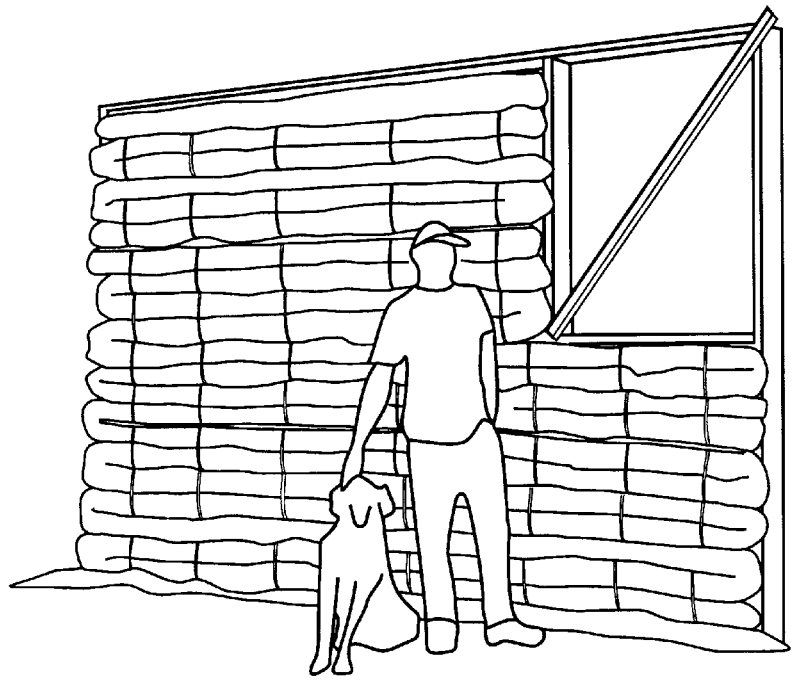

FIG. 3B is a view of the completed wall of FIG. 3A having a window frame in one corner.

DETAILED DESCRIPTION OF THE INVENTION

An insulated wall is constructed according to the invention as follows:

1. Two corner posts are set in the ground, to define the ends of the wall.

2. A length of fabric tube, for example, woven polypropylene, 18 inches wide, is unrolled from a large roll and laid on the ground between the posts. About 1 foot of the open end of the tube is folded over and tucked underneath itself and taped shut. One or more slits are cut in the top layer of fabric between the poles using a hot knife. The hot knife seals the fabric as it cut, preventing it from unraveling.

3. A fill pipe is placed through a slit closest to, and pushed toward the end of the tube that is folded over.

4. Bulk loose fill material is blown or mechanically conveyed through the fill pipe, which is pulled out of the slit gradually as the end of the fabric tube filled up with material to a height of about six inches. When the fabric tube is filled from the end post to the slit, the fill pipe is removed and reinserted through the slit in the fabric roll toward the opposite pole. An additional part of the of the fabric tube between the posts was also filled to a height of about 6 inches.

5. The surface of the filled tube is leveled.

6. The fabric tube is layered over itself and the process is repeated.

7. A slant fill process may also be used, with filling from a slit at one end of the wall.

8. The layering process is continued until the desired wall height is reached. The lower part of the wire mesh preferably is anchored to the ground with steel rods. The wall would be finished with mesh and stucco on the outer side for retrofit and on both sides for new wall construction.

For retrofit:

The most preferred embodiment of the process of the invention for insulating existing walls comprises:

(1) erecting corner posts at the ends of the wall to be insulated, the top ends of the posts being tied to each other and/tied or otherwise anchored to the wall, (2) laying a base on the ground at the foot of the wall for the insulation, (3) stacking layers of fabric tubes filled with insulating material on the base until the wall is covered, said layers having fasteners to attach to a mesh, (4) stretching a mesh over the bags between the corner posts, (5) fastening the mesh to said posts, (6) attaching the mesh to said fasteners, and (7) applying a cementitious material to the mesh and allowing it to harden.

A preferred process includes anchoring the lower part of the mesh to the ground with steel rods after step 6 and before step 7 above. Furthermore, the step of stacking layers of fabric tubes may be carried out by wrapping a continuous fabric tube around a walled structure and filling the tube with insulating material, an insulated wall structure being built up by successive layers of said tube resting on each other. When this method is employed, a U-turn may be made with the tube when encountering a window or door, and the tube is then laid down in the opposite direction until encountering a window or door again, when another U-turn is made. To create a wall a continuous tube of fabric can be wrapped around corner posts and filled, thereby creating a wall comprised of successive layers of the filled tube stacked on top of one another. It is apparent that the invention can be used for the walls of houses, buildings, and other structures. The invention may also be used to insulate structures such as storage tanks (e.g., tanks for heating oil).

Figure 1A:
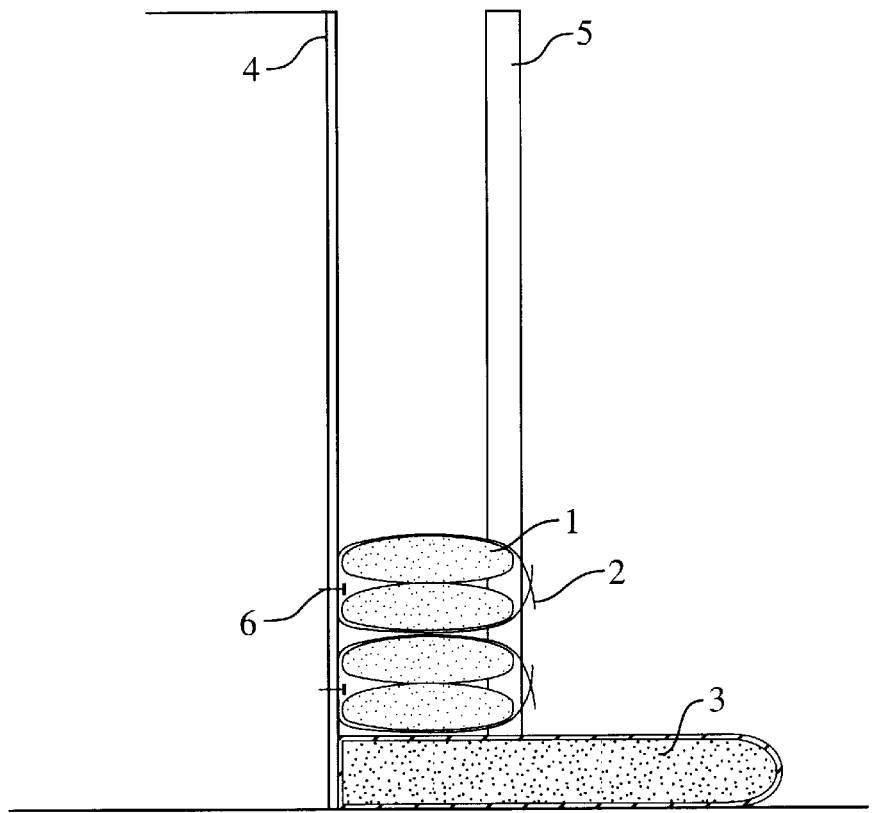
FIG. 1A is a side view of the layers of fabric tubes of insulating material next to the exterior wall of a building before application of cementitious material.
Figure 1B:
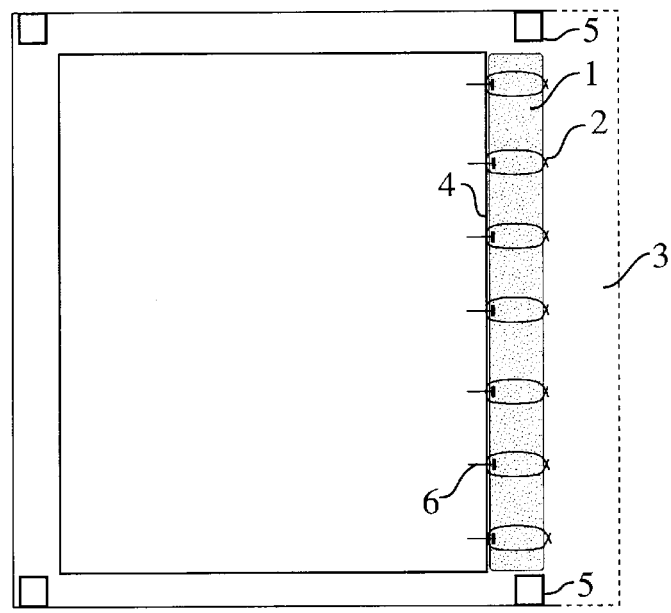
FIG. 1B is a top view showing the tubes with straps looped around them and corner posts at the ends of the wall.

Referring to the drawings, FIG. 1A is a side view of the layers of fabric tubes (1) of insulating material stacked on the base (3) next to the wall (4) of an existing house with straps (2) looped around adjacent layers and fastened to the wall with nails (6). The corner posts (5) at the ends of the wall are preferably set in the ground. Mesh will then be fasted to the corner posts and the straps will be fasted to the mesh. The cementitious material will then be applied to the mesh. FIG. 1B is a top view showing the layers of fabric tube stacked up along the length of wall (4) between corner posts (5).

The corner posts erected at the ends of the wall are stationary objects to which the mesh can be fastened. They also help to form square corners on the insulation at the ends of the wall. If corner posts are not used, the mesh can be fastened to the wall (the wall ends being stationary objects). In either case, the length of the insulating structure is self-supporting with the bags supporting the mesh and stucco skin. The use of supporting studs can thereby be avoided.

It is also preferred to lay a base of cement or crushed rock wrapped in a non-woven fabric to minimize water erosion under the bags of insulating material.

The layers of fabric tubes of insulating material may have straps looped between them and fastened to the wall. These straps are also used to attach to the mesh. Other types of fasteners for fastening the mesh to the bags and, preferably, also fastening the fabric layers to the wall, may be used as well. Equivalents of the layers of fabric tubes containing insulating material may be used also, such as a wall-sized sack with horizontal ties, as a means of containing the insulating material.

The insulating material may be pumice, fiberglass, rock wool, milled pulverized paper, wood pulp, expanded clays and shales, perlite, flyash, bottom ash, agricultural waste materials such as straw, leaves, shredded leaves, wood chips, sawdust, peat moss, vermiculite, or other natural, manufactured, waste or recycled resource-efficient material having a reasonable insulation value.

The process of the invention has proven useful in insulating existing adobe walls. It may be used with other types of walls also. In a test of the invention, a wall of an adobe house was insulated by stacking bags of pumice against it according to the method of the invention. The bags were covered with mesh and a glass fiber reinforced Portland cement stucco shell. This structure has not shown significant cracking or deterioration since it was constructed. The process of the invention yields an insulated structure comprising a stack of layers of fabric tube containing insulating material next to the exterior wall of a building, said stack of bags of insulating material being attached to said wall and having a covering of cementitious material on the side not adjacent to said wall. By "next to the exterior wall" is meant in close proximity to the wall, i.e., touching it or not more than a fraction of an inch therefrom. The U-bends at the end of the layers of fabric tube containing insulating material are lined up vertically on the sides of window and door openings. A lintel is placed on top of the layers of fabric tube containing insulating material at the level of the top of the window or door. Mesh is fastened to the lintel, and stucco is applied. No extra framing is needed. This system uses a minimal amount of lumber and conserves trees and forests. The invention may also be used for insulating nonlinear walls such as those of a circular storage tank (e.g., a fuel oil tank.)

The mesh is preferably anchored to the ground by weaving rebars (e.g., one-half inch) through the bottom 12 inches of the mesh and driving them into the ground. The rebars can be 3 feet long and spaced every 2 feet or so. A firm stucco shell is obtained by anchoring the mesh in this manner.

For new wall construction:

The same process described in items (1) through (7) above is used except the exterior surface treatment and foundation anchoring is applied to both sides of the new wall. The fill material may or may not have insulating properties. Depending on the fill material, the wall may be either load bearing or may be used for infill in a post and beam structure.

Referring to the drawings, FIG. 2A is a side view showing the fabric tubes (1) of insulating material stacked on the base (3) and having wire mesh (7) stretched on both sides. Wire mesh (7) is coated with cementitious layer (8). Reinforcing rods (9) are driven into the ground and preferably woven through the wire mesh and contained in the cementitious layer. FIG. 2(B) is a top view show the wall created by tubes (1) of insulating material with corner posts (5) at the corners and reinforcing rods (9). FIG. 3A shows the wall being created by blowing the fill material into the tube. Instead of blowing into the end of the tube as shown, a slit may be made in the side of a continuous tube, the blower nozzle inserted, and a section of tube is thereby filled. FIG. 3(B) shows a completed wall with window frame.

The invention is characterized by the following:

1. The process of the invention uses bulk loose fill material in a dry form. Since the material is not mixed with cement to form blocks or concrete, it does not lose its insulating value.
2. The system may not need a steel-reinforced concrete foundation or structural supports (depending on the fill material) and needs a very small amount of lumber. For retrofit, it does not add any additional structural loads to the existing wall. For new construction it can be either load bearing or used for infill, depending on the material. The fabric tubes are filled in place, and the material is pneumatically conveyed by means of a blower or mechanically conveyed. Both time and labor cost are greatly reduced.
3. The materials used are readily available, and expensive machinery and specialized equipment and skills are not needed. It is cheap and simple to construct. Depending on the fill material, the wall may be either load bearing or may be used for infill in a post and beam structure. By loose fill material is meant a material that can be blown into a tube by a blower, such as particulate material (e.g., fly ash), patelets (dried leaf material), or short fibers (shredded wood waste). Additionally, the loose fill material may contain dessicant materials. It may also contain phase change materials. The loose fill material (depending on the material chosen) will exhibit some degree of thermal inertia to counteract fluctuating external temperatures. The deep window wells created provide reduced solar heat gain in the summer. The thick walls are also bullet resistant.

I claim:

1. A process for creating or insulating a wall comprising:
   (a) filling a fabric tube with loose fill material by inserting the output of a blower or mechanical conveyer into the tube and blowing or mechanically conveying said loose fill material into said tube, said tube being of a length equal to the wall or wall segment being insulated or constructed and having at least one closed end,
   (b) when said tube has been filled, closing at least one end of the filled tube and placing an empty fabric tube on top of the filled tube and filling the said empty tube by blowing or mechanically conveying loose fill material into it, this process being repeated until a stack of filled tubes reaches the height of the wall to be insulated or constructed,
   (c) attaching a mesh to at least one side of said stack of filled tubes, and
   (d) applying a hardenable material to the mesh and allowing it to harden.
2. A process according to claim 1 wherein said loose fill material is an insulating material.
3. A process according to claim 2 wherein said insulating material is a particulate material having an R value of at least 0.5.
4. A process according to claim 1 wherein said hardenable material is a cementitious material.
5. A process according to claim 4 wherein said cementitious material is stucco.
6. A process according to claim 5 wherein said mesh is wire mesh or stucco netting.
7. A process according to claim 1 wherein the output of said blower or mechanical conveyer is inserted in an end of the tube or in a hole cut in the side of the tube.
8. A process according to claim 7 wherein the output of the blower is an elongated, hollow member which is inserted into said empty -fabric tube to be filled and is withdrawn as the fabric tube is filled.
9. A process according to claim 1 wherein said mesh is laid flat on the surface formed by the stacked, filled tubes and is attached by tying straps looped between the tubes to said mesh.
10. A process according to claim 1 wherein more than one of said fabric tubes are formed from a single piece of fabric which is folded over upon itself at the end of each tube, thereby forming the next tube to be filled on top of the tube that was previously filled.
11. A process according to claim 1 comprising, additionally, supporting said stack of filled tubes with posts which are set in the ground or attached to an adjacent wall.
12. A process according to claim 1 wherein said fabric tube is a continuous fabric tube wound around the walls of a structure and filled with said fill material.
13. A process according to claim 1 wherein said a base for said stack of fabric tubes is laid down at the bottom of the wall to be created or insulated, and said tubes are stacked on the base.
14. The process of claim 9 wherein said straps for attaching the mesh to the stack of bags are fastened to a wall to be insulated.
15. The process of claim 13 wherein said mesh is chicken wire or stucco netting.
16. The process of claim 14 having the additional step, prior to stacking the layers of fabric tubes filled with insulating material, of laying a base on the ground on which the fabric tube layers will be stacked, the upper surface of said base being above ground level.
17. The process of claim 16 wherein said base is comprised of cement.
18. The process of claim 16 wherein said base is comprised of crushed stone wrapped in a non-woven fabric.
19. The process of claim 13 having the additional step of erecting corner posts at the ends of the wall to be created or insulated, wherein said stationary objects are said corner posts.
20. The process of claim 13 wherein said posts are tied or otherwise anchored to the wall.
21. The process of claim 13 wherein said cementitious material is stucco, and the top ends of said posts are tied together.
22. A low-cost process for insulating walls comprising:
   (a) erecting corner posts at the ends of the wall to be insulated, the top ends of the posts being tied or otherwise anchored to the wall;

(b) laying a base on the ground at the foot of the wall between said corner posts for the insulation;

(c) stacking layers of fabric tube filled with insulating material on the base until the wall is covered, said layers having fasteners to attach to a mesh;

(d) stretching a mesh over the layers of filled fabric tubes between the corner posts on the side of said tubes which is not adjacent to said wall;

(e) fastening the mesh to said corner posts;

(f) attaching the mesh to said fasteners; and (g) applying a cementitious material to the mesh and allowing it to harden.

23. A process according to claim 22 comprising anchoring the bottom of the mesh to the base or ground before applying said cementitious material.

24. A process according to claim 22 wherein the step of stacking layers of fabric tubes comprises laying down a continuous fabric tube, filling part of said tube with insulating material, folding said tube, laying an additional part of said tube on the part that has already been filled, and filling said additional part with insulating material.

25. A process according to claim 22 wherein said base is comprised of crushed stone wrapped in non-woven fabric or cement.

26. A process for creating a wall comprising:

(a) filling a woven-fabric tube with loose fill material by inserting the output of a blower or mechanical conveyer into the tube and blowing or mechanically conveying said loose fill material into said tube, said tube having at least one closed end, (b) when said tube has been filled, closing at least one end of the filled tube and placing an empty woven-fabric tube on top of the filled tube and filling the said empty tube by blowing loose fill material into it, this process being repeated until a stack of filled tubes reaches the height of the wall to be constructed, (c) attaching a mesh to both sides of said stack of filled tubes, and (d) applying a hardenable material to the mesh and allowing it to harden.

27. A process according to claim 26 wherein said fill material is pumice, fiberglass, rock wool, milled pulverized paper, wood pulp, expanded clays and shales, perlite, flyash, bottom ash, agricultural waste materials such as straw, leaves, shredded leaves, sawdust, peat moss, vermiculite, or other natural, manufactured, waste or recycled material having a reasonable insulation value.

28. A process according to claim 26 wherein said hardenable material is stucco.

29. The process of claim 26 wherein said mesh is attached to the stack of layers of filled fabric tube by straps looped between adjacent layers.

30. A low-cost process for insulating walls comprising:

(a) stacking layers of fabric tubes filled with insulating material next to the exterior surface of a wall until the wall is covered, the layers of fabric tubes thus formed having fasteners to attach to a mesh, (b) stretching a mesh over the layers of fabric tubes covering the side of the tubes which is not adjacent to the wall, (c) attaching the mesh to said fasteners on said stack of bags, and (d) applying a cemetitious material to the mesh and allowing it to harden.

31. The process of claim 30 wherein said wall is the wall of a storage tank.

32. The process of claim 30 wherein said fasteners are also attached to the wall to be insulated.

33. The process of claim 30 wherein an above-ground base is laid down prior to stacking said fabric tubes, and said tubes are stacked on said base.

34. The process of claim 30 wherein said base is comprised of (1) cement or (2) crushed stone in a nonwoven fabric bag or tube.

* * * * *